US012797936B2

(12) United States Patent
Bae

(10) Patent No.: US 12,797,936 B2
(45) Date of Patent: Nov. 17, 2026

(54) BLANKING DEVICE AND METHOD OF MANUFACTURING ELECTRODE PLATE FOR SECONDARY BATTERY USING THE SAME

(71) Applicant: SAMSUNG SDI CO., LTD., Yongin-si (KR)

(72) Inventor: Tae-Hwan Bae, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 111 days.

(21) Appl. No.: 18/633,829

(22) Filed: Apr. 12, 2024

(65) Prior Publication Data

US 2025/0128311 A1 Apr. 24, 2025

(30) Foreign Application Priority Data

Oct. 24, 2023 (KR) ........................ 10-2023-0143104

(51) Int. Cl.
*B21D 28/34* (2006.01)
*H01M 4/04* (2006.01)

(52) U.S. Cl.
CPC .............. *B21D 28/34* (2013.01); *H01M 4/04* (2013.01)

(58) Field of Classification Search
CPC .... B21D 28/34; B21D 28/343; B21D 28/346; B21D 28/26; B21D 28/265; B26F 1/02–10; B26F 1/14
See application file for complete search history.

(56) References Cited

U.S. PATENT DOCUMENTS 3,871,254 A * 3/1975 Whistler, Jr. .......... B21D 28/34 83/139
4,104,941 A * 8/1978 Krueger ................. B21D 28/34 83/139
4,843,931 A * 7/1989 Whister ............... B26D 7/2614 83/685
8,375,834 B2 * 2/2013 Tosu .................... B21D 45/006 83/684
9,021,852 B2 * 5/2015 Zhang .................. B21D 35/001 72/328
9,561,534 B2 * 2/2017 Greenleaf ............ B21D 28/346
9,630,233 B2 * 4/2017 Schlatter ............. H01M 8/0206
(Continued)

FOREIGN PATENT DOCUMENTS

JP 1998-277662 A 10/1998
KR 10-2019-0109945 A 9/2019
(Continued)

OTHER PUBLICATIONS

Extended European Search Report dated Dec. 12, 2024, for corresponding EP Application No. 24193427.2.

*Primary Examiner* — Boyer D Ashley
*Assistant Examiner* — Richard D Crosby, Jr.
(74) *Attorney, Agent, or Firm* — Lee IP Law, P.C.

(57) ABSTRACT

A blanking device for a secondary battery electrode plate, including a first mold including a die and a first stripper, the die surrounding the first stripper and having a structure with one open side portion, and the first stripper having a structure with one open side portion aligned with the one open side portion of the die, and a second mold facing the first mold, the second mold including a punch and a second stripper, and the first mold being moveable toward the second mold.

14 Claims, 11 Drawing Sheets

(56) References Cited

U.S. PATENT DOCUMENTS

| | | | | |
|---|---|---|---|---|
| 10,252,318 | B2 * | 4/2019 | Izumi | H02K 15/02 |
| 11,267,035 | B2 * | 3/2022 | Li | B21D 28/02 |
| 11,466,453 | B2 * | 10/2022 | Lehane | E04B 9/0464 |
| 11,642,717 | B2 * | 5/2023 | Takahashi | B21D 28/14<br>29/557 |
| 2011/0067538 | A1 * | 3/2011 | Greenleaf | B21D 28/26<br>83/698.31 |
| 2013/0019732 | A1 * | 1/2013 | Yotsumoto | B26F 1/384<br>83/591 |
| 2013/0186245 | A1 * | 7/2013 | Onishi | B21D 28/06<br>83/618 |
| 2015/0306653 | A1 * | 10/2015 | Mathias | B21D 28/10<br>700/219 |
| 2016/0193747 | A1 | 7/2016 | Greenleaf | |
| 2016/0332207 | A1 * | 11/2016 | Izumi | H02K 15/03 |
| 2018/0200773 | A1 * | 7/2018 | Nishijima | B21J 5/02 |
| 2018/0297100 | A1 * | 10/2018 | Murata | B21D 39/00 |
| 2019/0039112 | A1 | 2/2019 | Hirata et al. | |
| 2020/0269303 | A1 * | 8/2020 | Takahashi | G01L 5/167 |
| 2020/0290106 | A1 * | 9/2020 | Sumiyama | B21D 45/003 |
| 2020/0331052 | A1 * | 10/2020 | Lozano Bonet | B21D 28/26 |

FOREIGN PATENT DOCUMENTS

| | | | |
|---|---|---|---|
| KR | 10-2034079 | B1 | 10/2019 |
| KR | 10-2252500 | B1 | 5/2021 |

* cited by examiner

BLANKING DEVICE AND METHOD OF MANUFACTURING ELECTRODE PLATE FOR SECONDARY BATTERY USING THE SAME

CROSS-REFERENCE TO RELATED APPLICATION

The present application claims priority to and the benefit of Korean Application No. 10-2023-0143104, filed on Oct. 24, 2023, in the Korean Intellectual Property Office, the entire disclosure of which is incorporated by reference herein.

BACKGROUND

1. Field

The present disclosure relates to a blanking device and a method of manufacturing an electrode plate using the blanking device. Particularly, the present disclosure relates to a blanking device having a structure of which one side portion is open and a method of manufacturing an electrode plate using the blanking device.

2. Description of the Related Art

Secondary batteries are rechargeable batteries that may be charged and discharged multiple times. The secondary batteries are mainly used in various application fields, such as electronic devices (smartphones, laptops, tablets, and so on), electric vehicles, solar power generation and emergency power supplies. For example, lithium-ion batteries have high energy density and high charge/discharge efficiency and are used in various electronic devices and electric vehicles.

Positive and negative electrode plates of lithium-ion batteries may be manufactured by applying a cathode active material to positive electrode electron collectors in the form of a metal thin film (e.g., aluminum foil) and by applying a negative electrode active material to negative electrode electron collectors in the form of a metal thin film (e.g., copper foil). For example, an electrode plate manufacturing process may include mixing, coating, and pressing processes of manufacturing roll-shaped metal thin film substrates coated with active materials, and slitting and notching processes of cutting roll-shaped metal thin film substrates according to battery specifications.

The above information disclosed in this Background section is for enhancement of understanding of the background of the present disclosure, and therefore, it may contain information that does not constitute related (or prior) art.

SUMMARY

Aspects of embodiments provide a blanking device for a secondary battery electrode plate, including a first mold including a die and a first stripper, the die surrounding the first stripper and having a structure with one open side portion, and the first stripper having a structure with one open side portion aligned with the one open side portion of the die, and a second mold facing the first mold, the second mold including a punch and a second stripper, and the first mold being moveable toward the second mold.

According to an embodiment of the present disclosure, the first stripper may include a vertical portion perpendicular to a longitudinal direction of the one open side portion of the first stripper, a first horizontal portion and a second horizontal portion extending in the longitudinal direction of the one open side portion of the first stripper at both ends of the vertical portion, and a tab portion protruding from an outer portion of the first horizontal portion, and the first horizontal portion and the second horizontal portion may be separated from each other, the one open side portion of the first stripper being between the first horizontal portion and the second horizontal portion.

According to an embodiment of the present disclosure, the die may surround only outer portions of the first horizontal portion, the tab portion, the vertical portion, and the second horizontal portion of the first stripper.

According to an embodiment of the present disclosure, the punch may have a closed structure, as viewed in a top view, the first horizontal portion and the second horizontal portion of the first stripper overlapping edges of the punch, as viewed in the top view.

According to an embodiment of the present disclosure, the second stripper may surround an outer portion of the punch.

According to an embodiment of the present disclosure, the die and the first stripper respectively may face the second stripper and the punch.

According to an embodiment of the present disclosure, the die and the first stripper may be configured to be moveable together toward the second stripper and the punch, and the die and the second stripper may be configured to be moveable together toward a bottom of the punch, such that the die is misaligned with the first stripper.

According to an embodiment of the present disclosure, the first mold may further include a die plate accommodating the die and the first stripper, and a first base plate coupled to the die plate.

According to an embodiment of the present disclosure, the second mold may further include a punch plate accommodating the punch and the second stripper, and a second base plate coupled to the punch plate.

According to an embodiment of the present disclosure, the blanking device may further include a main guide post connecting the first base plate to the second base plate, a sub-guide post connecting the die plate to the second base plate, and a punch guide post connecting the second stripper to the second base plate.

According to an embodiment of the present disclosure, the main guide post and the sub-guide post may be configured to guide the first mold toward the second mold.

According to an embodiment of the present disclosure, the sub-guide post may be configured to guide the die plate and the die toward a bottom of the punch from a state where the die and the first stripper are aligned and are respectively in contact with the punch and the second stripper.

According to an embodiment of the present disclosure, the punch guide post may be configured to guide the second stripper toward a bottom of the punch from a state where the die and the first stripper are aligned and are respectively in contact the punch and the second stripper.

According to an embodiment of the present disclosure, the blanking device may further include an electrode plate transfer device insertable in the aligned open side portions of the die and the first stripper.

Aspects of embodiments also provide a method of manufacturing an electrode plate for a secondary battery, including aligning a substrate between a first mold and a second mold of a blanking device, the first mold having one open side portion in a direction in which the substrate is pulled out, lowering the first mold toward the second mold to fix the substrate, making an electrode plate by blanking the substrate, and transferring the electrode plate to a subsequent process by an electrode plate transfer device, the electrode plate transfer device entering the one open side portion of the first mold.

According to an embodiment of the present disclosure, the one open side portion of the first mold may be parallel to a transfer direction of the substrate between the first mold and the second mold.

According to an embodiment of the present disclosure, aligning the substrate between the first mold and the second mold of the blanking device may include supplying the substrate between the first mold and the second mold in a direction oriented from a closed side portion of the first mold toward the one open side portion of the first mold.

According to an embodiment of the present disclosure, aligning the substrate between the first mold and the second mold of the blanking device may include aligning the substrate such that a cutting line in a punching region of the blanking device is continuously formed.

According to an embodiment of the present disclosure, lowering the first mold toward the second mold to fix the substrate may include fixing the substrate between the first mold, which includes a die and a first stripper, and a second mold, which includes a punch and a second stripper, by lowering the first mold toward the second mold, and applying tension to the substrate by the electrode plate transfer device entering the one open side portion of the first mold.

According to an embodiment of the present disclosure, making the electrode plate by blanking the substrate may include lowering the die and the second stripper together to blank the substrate in a state where the substrate is fixed.

These and other aspects and features of the present disclosure will be described in or will be apparent from the following description of embodiments of the present disclosure.

BRIEF DESCRIPTION OF DRAWINGS

The following drawings attached to this specification illustrate embodiments of the present disclosure, and further describe aspects and features of the present disclosure together with the detailed description of the present disclosure. Thus, the present disclosure should not be construed as being limited to the drawings.

DETAILED DESCRIPTION

Figure 1:
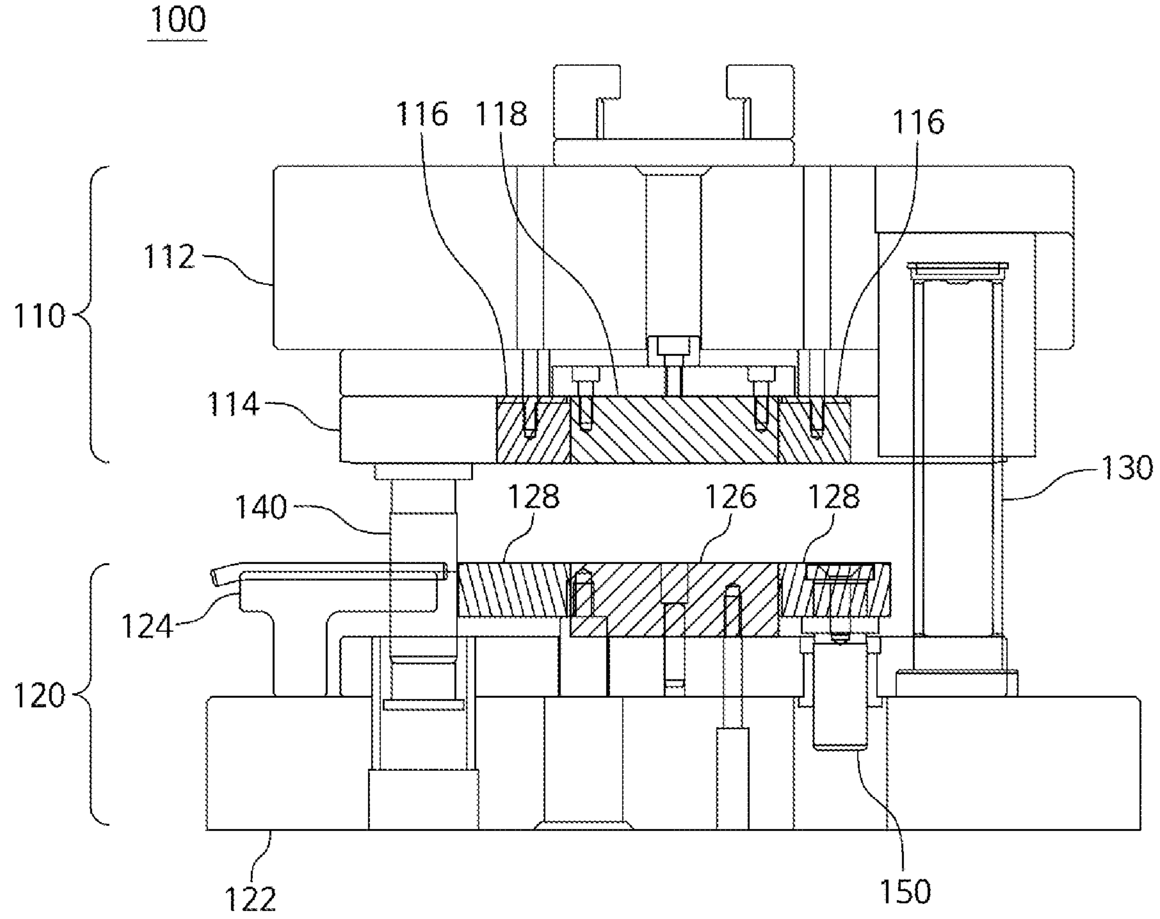
FIG. 1 illustrates a front view showing a blanking device according to an embodiment of the present disclosure.

Hereinafter, embodiments of the present disclosure will be described, in detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain his/her invention in the best way.

The embodiments described in this specification and the configurations shown in the drawings are only some of the embodiments of the present disclosure and do not represent all of the technical ideas, aspects, and features of the present disclosure. Accordingly, it should be understood that there may be various equivalents and modifications that can replace or modify the embodiments described herein at the time of filing this application.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Furthermore, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may be disposed in contact with the upper (or lower) surface of the element, and another element may also be interposed between the element and the arbitrary element disposed on (or under) the element.

In addition, it will be understood that when a component is referred to as being "linked," "coupled," or "connected" to another component, the elements may be directly "coupled," "linked" or "connected" to each other, or another component may be "interposed" between the components".

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

FIG. 1 illustrates a front view showing a blanking device according to an embodiment of the present disclosure.

Referring to FIG. 1, a blanking device 100 according to the present disclosure may be a punching mold that may blank a continuously provided metal thin film substrate and cut the metal thin film substrate to an electrode plate in a predetermined standard. Referring to FIG. 1, the blanking device 100 may include a first mold 110 and a second mold 120. Herein, the first mold 110 may refer to an upper mold. Furthermore, the second mold 120 may refer to the lower mold.

The first mold 110 may include a first base plate 112, a die plate 114, a die 116, and a first stripper 118. The first mold 110 may be vertically moveable along a direction parallel to a direction of gravity (e.g., move up and down relative to the second mold 120).

The die plate 114 may be fixedly coupled to a lower portion of the first base plate 112, e.g., the die plate 114 may be fixedly coupled to a portion of the first base plate 112 that faces the second mold 120. The die 116 and the first stripper 118 may be buried (e.g., embedded) in the die plate 114. For example, the die plate 114 may have a space in which the die 116 and the first stripper 118 may be accommodated. The die 116 and the first stripper 118 may each be coupled to the die plate 114 by a connection member (e.g., surfaces of the die 116, the first stripper 118, and the die plate 114 that face the second mold 120 may be coplanar).

The die 116 may accommodate the first stripper 118, e.g., the first stripper 118 may fit into a space within or be surrounded by the die 116. The first stripper 118 may correspond to (e.g., overlap) at least a part of an outline of a punch 126 installed in the second mold 120 and may fix a metal thin film substrate pulled in during a blanking process.

According to an embodiment, the die 116 and the first stripper 118 may each be designed to have one opened side portion, as will be described in more detail below with reference to FIG. 3. The blanking device 100 may be configured such that a substrate is supplied in an opening direction of the die 116. Detailed descriptions of shapes of the die 116 and the first stripper 118 will be described with reference to FIGS. 3, 4, 6, and 7.

The second mold 120 may include a second base plate 122, a punch plate 124, the punch 126, and a second stripper 128. For example, as illustrated in FIG. 1, the second mold

120 may be arranged under the first mold 110, e.g., the first and second molds 110 and 120 may vertically overlap each other.

The punch plate 124 may be coupled to an upper portion of the second base plate 122, e.g., the punch plate 124 may be coupled to a portion of the second base plate 122 that faces the first mold 110. The second stripper 128 and the punch 126 may be buried (e.g., embedded) in the punch plate 124. For example, the punch plate 124 may have a space in which the second stripper 128 and the punch 126 may be accommodated. The second stripper 128 and the punch 126 may each be coupled to the punch plate 124 by a connection member. Furthermore, a punch guide post 150 may connect the second stripper 128 to the second base plate 122. Herein, the punch guide post 150 may guide movement (e.g., lifting or lowering) of the second stripper 128.

The punch 126 may be formed in a shape corresponding to a predetermined standard. In a case where the first mold 110 is lowered (e.g., moved toward the second mold 120), the punch 126 may come into contact with the first stripper 118 (e.g., via a metal thin film substrate) and may fix the metal thin film substrate (e.g., between the punch 126 and the first stripper 118). Furthermore, the second stripper 128 may accommodate an outline of the punch 126. In a case where the first mold 110 is lowered, the second stripper 128 may come into contact with the die 116 and may cut the metal thin film substrate that moves downward with the die 116.

The first mold 110 and the second mold 120 of the blanking device 100 may be assembled to be separated (e.g., separable) from each other and connected (e.g., connectable) to each other by a main guide post 130 and a sub-guide post 140. For example, the main guide post 130 may connect the first base plate 112 to the second base plate 122. The sub-guide post 140 may connect the die plate 114 to the second base plate 122.

The main guide post 130 and the sub-guide post 140 may be designed to guide movement (e.g., lifting or lowering) of the first mold 110. For example, the main guide post 130 may guide the first base plate 112 to lift or lower (e.g., the first base plate 112 may move along the main guide post 130 toward or away from the second mold 120), and the sub-guide post 140 may guide the die plate 114 to lift or lower. In another example, the main guide post 130 and the sub-guide post 140 may be designed to guide a first lowering of the first mold 110, so the first mold 110 may lift or lower together with components connected to the first base plate 112 and the die plate 114. Descriptions of a lowering operation of the first mold 110 are made with reference to FIG. 2.

The blanking device 100 illustrated in FIG. 1 may further include components necessary for manufacturing a secondary electrode plate in addition to the components described above.

Figure 2:
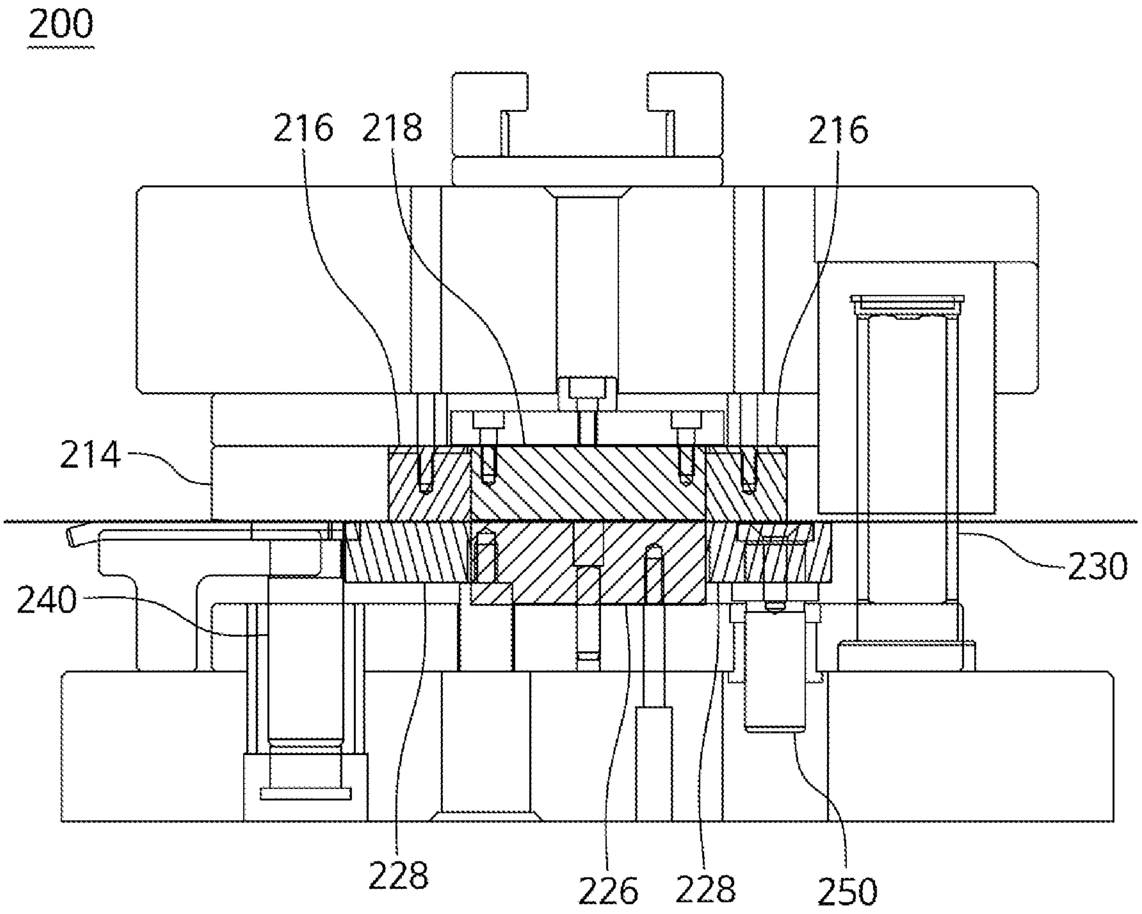
FIG. 2 illustrates a front view showing a blanking device in a state where a first mold is lowered, according to an embodiment of the present disclosure.

FIG. 2 illustrates a front view showing a blanking device 200 in a state where a first mold is lowered, according to an embodiment of the present disclosure. The blanking device 200 may manufacture an electrode plate for a secondary battery of a certain standard by fixing and cutting a metal thin film substrate by lowering the first mold (e.g., the first mold 110 in FIG. 1). For example, the blanking device 200 may be substantially the same as the blanking device 100 of FIG. 1.

First, referring to FIG. 2, as the first mold is lowered toward the second mold, the metal thin film substrate provided between the first mold and a second mold (e.g., the second mold 120 in FIG. 1) may be fixed. For example, as illustrated in FIG. 2, the first mold may be lowered to fix the metal thin film substrate provided between a die 216 and a first stripper 218 of the first mold and a punch 226 and a second stripper 228 of the second mold. For example, at this point, the metal thin film substrate may be contacted simultaneously by the first and second molds and held securely between the first and second molds.

Thereafter, the die 216 of the first mold and the second stripper 228 of the second mold may be lowered secondly to cut the metal thin film substrate in a predetermined standard. For example, at a state where the first mold is lowered to fix the metal thin film substrate provided between the die 216 and the first stripper 218 of the first mold and the punch 226 and the second stripper 228 of the second mold is fixed, the die 216 of the first mold and the second stripper 228 of the second mold may be lowered secondly to cut the metal thin film substrate in a predetermined standard. For example, while the metal thin film substrate is held securely between the first and second molds, the die 216 of the first mold and the second stripper 228 of the second mold may be moved simultaneously (e.g., together and at the same time) in a direction oriented from the first mold toward the second mold, such that a portion of the metal thin film substrate overlapped by the die 216 and the second stripper 228 may be cut from the remainder of the metal thin film substrate.

The sub-guide post 240 and the punch guide post 250 of the blanking device 200 may guide the die plate 214 and die 216 of the first mold and the second stripper 228 of the second mold to be lifted or lowered. For example, in a state where the die 216 and the first stripper 218 are respectively in contact with the punch 226 and the second stripper 228, the sub-guide post 240 may guide the die plate 214 and the die 216 of the first mold to be lowered secondly. In addition, in a state where the die 216 and the first stripper 218 are respectively in contact with the punch 226 and the second stripper 228, the punch guide post 250 may guide the second stripper 228 of the second mold to be lowered secondly.

Figure 3:
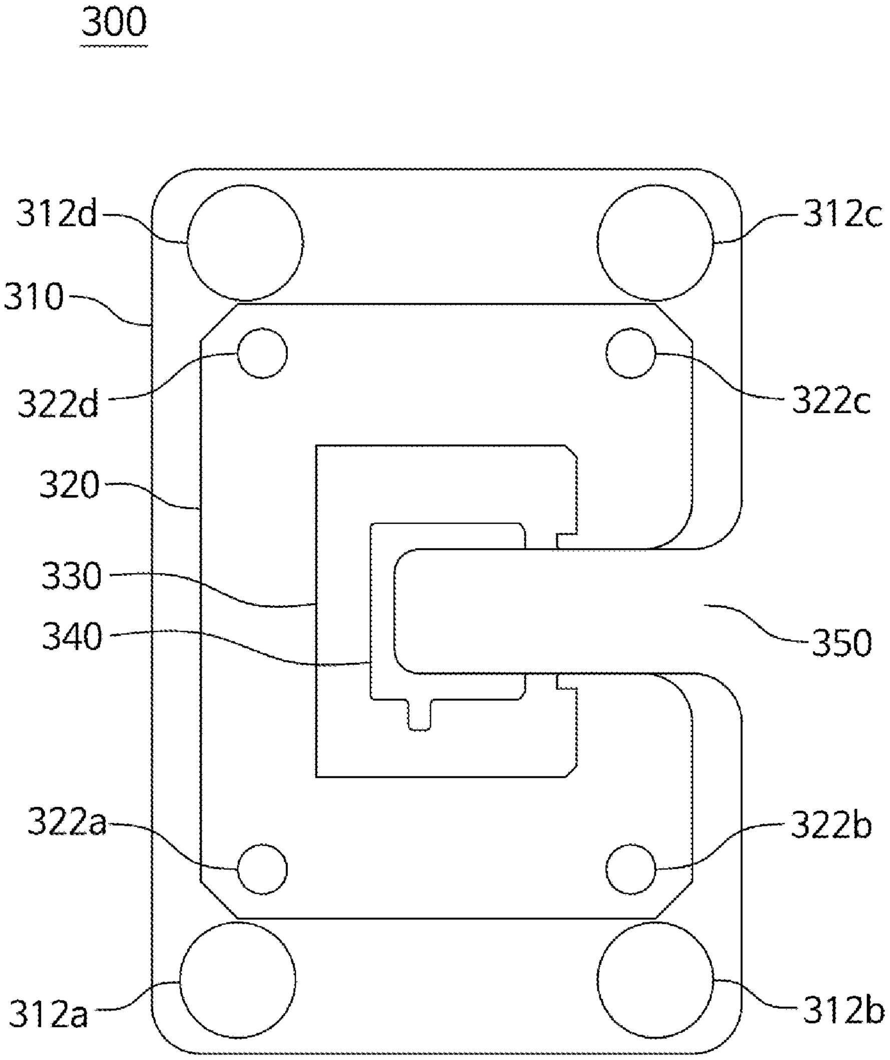
FIG. 3 illustrates a plan view showing a first mold according to an embodiment of the present disclosure.

FIG. 3 illustrates a plan view showing a first mold 300 according to an embodiment of the present disclosure. The first mold 300 may have a substantially same structure as the first mold 110 of FIG. 1.

Referring to FIG. 3, the first mold 300 may include a first base plate 310, a die plate 320, a die 330, and a first stripper 340. The first mold 300 may have an opening in a direction in which a metal thin film substrate is provided in the blanking device (e.g., the first mold 110 in FIG. 1) is discharged. For example, the first base plate 310, the die plate 320, the die 330, and the first stripper 340 may be formed such that an opening is formed in a direction in which the metal thin film substrate is discharged. For example, as illustrated in FIG. 3, each of the first base plate 310, the die plate 320, the die 330, and the first stripper 340 may have an opening in one side thereof, as viewed in a top view. For example, as illustrated in FIG. 3, each of the first base plate 310, the die plate 320, the die 330, and the first stripper 340 may have three sides perpendicular to each other and continuously connected to each other, as viewed in a top view, and may include the opening in a fourth side (e.g., the fourth side may face a second side that is between the first and third sides). For example, as illustrated in FIG. 3, the openings in the first base plate 310, the die plate 320, the die 330, and the first stripper 340 may face a same direction and may be aligned with each other to define a single and continuous opening (i.e., an open region 350) that partially intersects each of the first base plate 310, the die plate 320, the die 330, and the first stripper 340.

The first base plate 310 may be coupled to the die plate 320. In a case where the first mold 300 is positioned on an upper portion of a second mold (e.g., the second mold 120 in FIG. 1), the die plate 320 may be coupled to a lower portion of the first base plate 310 through a connection member.

The first base plate 310 may be assembled with main guide bushes 312*a*, 312*b*, 312*c*, and 312*d*, into which main guide pipes of main guide posts (e.g., the main guide post 130 in FIG. 1) are respectively inserted. For example, the main guide bushes 312*a*, 312*b*, 312*c*, and 312*d* may be fixedly coupled to the first base plate 310 through connection members. The main guide posts may be designed to move up and down while the main guide pipes are respectively inserted into the main guide bushes 312*a*, 312*b*, 312*c*, and 312*d*. The main guide posts may be designed to allow the main guide pipes to move up and down, e.g., by a plane guide method or a ball guide method.

The die plate 320 may be formed with sub-guide post holes 322*a*, 322*b*, 322*c*, and 322*d*, which are perforated holes, in each of which one end portion of a sub-guide post (e.g., the sub-guide post 140 in FIG. 1) is fixed. A sub-guide bush may be installed at a position corresponding to each of the sub-guide post holes 322*a*, 322*b*, 322*c*, and 322*d*, on a punch plate (e.g., the punch plate 124 in FIG. 1) of a second mold (e.g., the second mold 120 in FIG. 1). The sub-guide post may be designed to move up and down as the sub-guide pipe is inserted into the sub-guide bush. The sub-guide post may be designed to allow the sub-guide pipe to move up and down, e.g., by a plane guide method or a ball guide method.

In addition, the die plate 320 may have a space to accommodate the die 330 and the first stripper 340, and the die 330 and the first stripper 340 may be buried in the space. The die 330 and the first stripper 340 may each be coupled to the die plate 320 by a connection member.

The die 330 may accommodate the first stripper 340. The first stripper 340 may have a shape corresponding to at least a part of an outline of a punch (e.g., the punch 126 in FIG. 1) having a shape corresponding to a predetermined standard. The die 330 and the first stripper 340 may have an opening in a direction in which a metal thin film substrate is discharged.

According to an embodiment, an electrode plate transfer device may enter through the open region 350 of the first mold 300 to adsorb (e.g., connect to) and fix (e.g., secure) a metal thin film substrate and transfer an electrode plate obtained by blanking and cutting the metal thin film substrate. For example, as the first mold 300 first lowers and fixes the metal thin film substrate, the electrode plate transfer device may be inserted into the open region 350 to adsorb (e.g., connect to) the metal thin film substrate and apply tension to the metal thin film substrate. Thereafter, the first mold 300 may be lowered further to blank the fixed metal thin film substrate. After an electrode plate of a predetermined standard is cut from the metal thin film substrate, the electrode plate transfer device (which previously connected to and secured a portion of the metal thin film substrate to be cut) may immediately transfer the adsorbed cut metal thin film substrate to an inspection device for detecting defects of the electrode plate.

Through this configuration, in the blanking device 100, the electrode plate transfer device enters the open region 350 of the first mold 300, while the first mold 300 for cutting the metal thin film substrate lowers, and transfer the cut metal thin film substrate to the transfer device, while the first mold 300 lifts. In other words, the electrode plate transfer device according to example embodiments secures the cut metal thin film substrate and moves it to the transfer device, while the first mold 300 lowers and lifts once (e.g., during a single down/up cycle of the first mold 300). Compared to transferring the cut metal thin film substrate only after the first mold has already lowered and lifted once (e.g., only after a single down/up cycle of the first mold 300 is completed), the time required for a transfer cycle according to example embodiments may be reduced, thereby increasing the speed of a blanking process.

Furthermore, while the first mold 300 is lowered, the electrode plate transfer device may enter through the open region 350 of the first mold 300, the metal thin film substrate may be cut in a state where the metal thin film substrate is adsorbed and fixed, and the cut metal thin film substrate adsorbed and fixed by the electrode plate transfer device may be immediately transferred to the inspection device for detecting defects of the electrode plate. As an end portion of the metal thin film substrate is aligned to correspond to an outline of a punch, a blanking process may be performed without leaving any space in the metal thin film substrate, and accordingly, the productivity of an electrode plate to an area of a metal thin film substrate may be increased.

Figure 4:
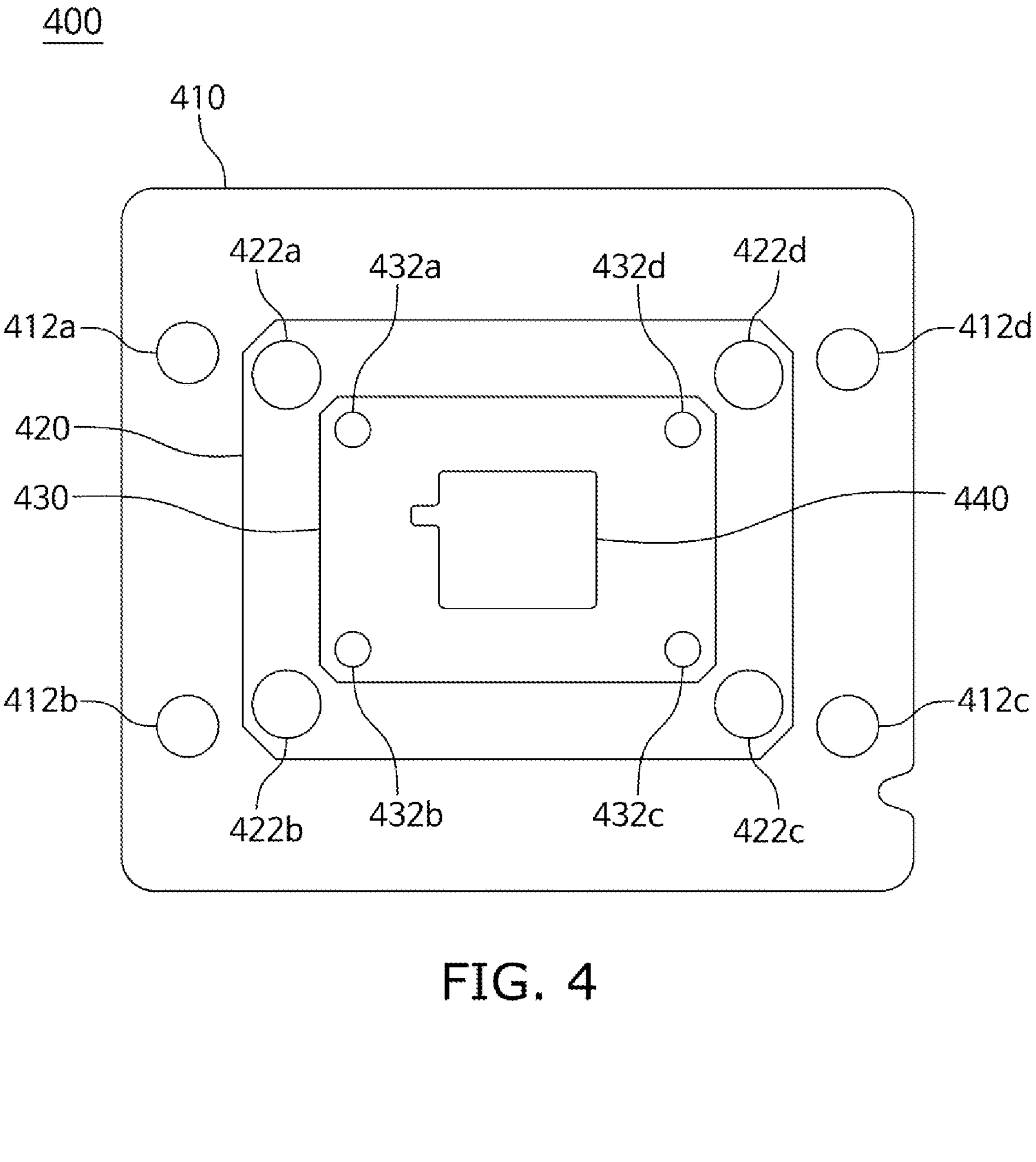
FIG. 4 illustrates a plan view showing a second mold according to an embodiment of the present disclosure.

FIG. 4 illustrates a plan view showing a second mold 400 according to an embodiment of the present disclosure. The second mold 400 may have a substantially same structure as the second mold 120 of FIG. 1.

Referring to FIG. 4, the second mold 400 may include a second base plate 410, a punch plate 420, a second stripper 430, and a punch 440.

The second base plate 410 may be coupled to the punch plate 420. The punch plate 420 may be coupled to an upper portion of the second base plate 410 through a connection member.

The second base plate 410 may be formed with main guide post holes 412*a*, 412*b*, 412*c*, and 412*d*, which are perforated holes in each of which one end portion of a main guide post (e.g., the main guide post 130 in FIG. 1) is fixed. Main guide bushes (e.g., 312*a*, 312*b*, 312*c*, and 312*d* in FIG. 3) may be installed at positions corresponding to the main guide post holes 412*a*, 412*b*, 412*c*, and 412*d*, on the first base plate (e.g., the first base plate 310 in FIG. 3) of a first mold (e.g., the first mold 110 in FIG. 1).

Sub-guide bushes 422*a*, 422*b*, 422*c*, and 422*d* into which sub-guide pipes of sub-guide posts (e.g., the sub-guide post 140 in FIG. 1) are inserted may be assembled to the punch plate 420. For example, the sub-guide bushes 422*a*, 422*b*, 422*c*, and 422*d* may be fixedly coupled to the second base plate 410 through connection members. The sub-guide posts may be designed to move up and down in a state where the sub-guide pipes are respectively inserted into the sub-guide bushes 422*a*, 422*b*, 422*c*, and 422*d*. The sub-guide posts may be designed to allow the sub-guide pipe to move up and down by a plane guide method or a ball guide method but is not limited thereto.

Furthermore, the punch plate 420 may have a space in which the second stripper 430 and the punch 440 may be accommodated, and the second stripper 430 and the punch 440 may be buried in the space. The second stripper 430 and the punch 440 may each be coupled to the punch plate 420 by a connection member.

The second stripper 430 may accommodate the punch 440. The second stripper 430 may have a shape corresponding to an outline of the punch 440 having a shape corresponding to a predetermined standard.

The second stripper 430 may be formed with punch guide post holes 432*a*, 432*b*, 432*c*, and 432*d*, which are perforated holes in each of which one end portion of a punch guide post (e.g., the punch guide post 150 in FIG. 1) is fixed. Punch guide bushes may be installed at positions respectively corresponding to the punch guide post holes 432*a*, 432*b*, 432*c*, and 432*d*, on a first base plate (e.g., the first base plate 310 in FIG. 3) of a first mold (e.g., the first mold 110 in FIG. 1).

Figure 5:
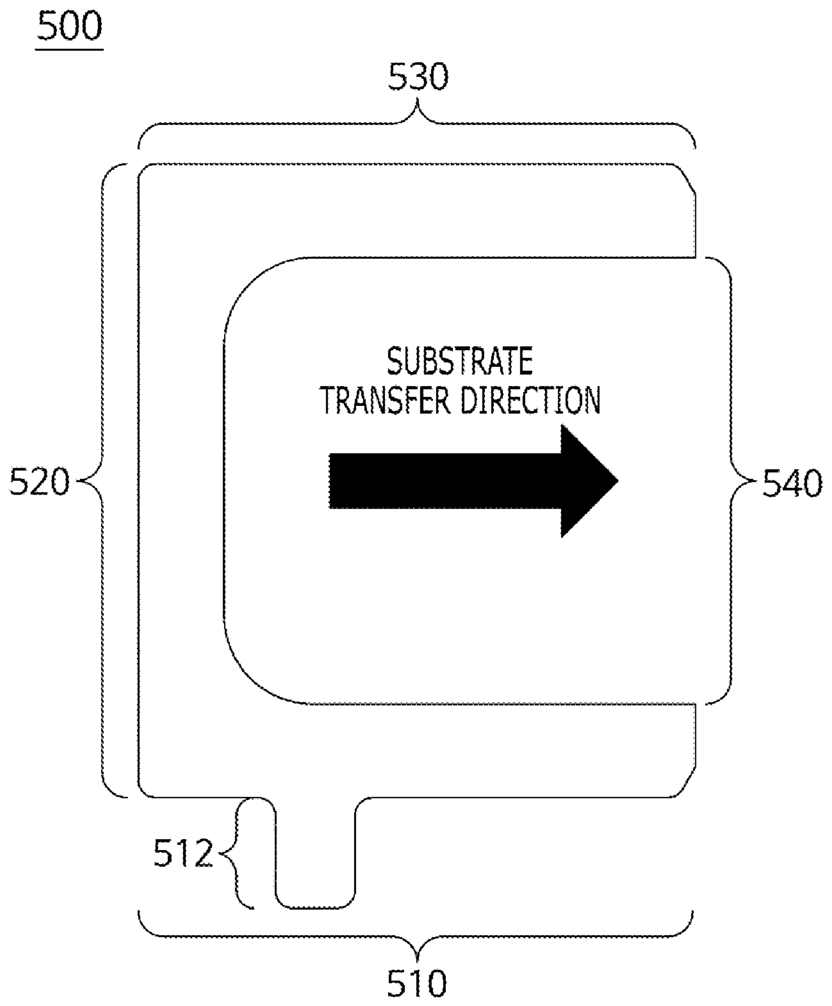
FIG. 5 illustrates a plan view showing a first stripper according to an embodiment of the present disclosure.

FIG. 5 illustrates a plan view showing a first stripper 500 according to an embodiment of the present disclosure. The first stripper 500 may have a substantially same structure as the first stripper 340 of FIG. 3.

Referring to FIG. 5, the first stripper 500 may be formed to fix a metal thin film substrate pulled in during a blanking process. Furthermore, the first stripper 500 may have an outline shape corresponding to at least a part of an outline of a punch of a predetermined standard. For example, in the first stripper 500, an outer edge, excluding a side portion 540, may have a shape corresponding to an outer edge of the punch.

According to an embodiment, the first stripper 500 may be designed such that the side portion 540 is open (e.g., corresponding to the opening of the first stripper 340 defining part of the open region 350 in FIG. 3). The first stripper 500 may be designed to correspond to an opening direction of a die. The first stripper and the opening direction of the die may be parallel to a substrate transfer direction an arrow.

For example, the first stripper 500 may include a vertical portion 520 perpendicular to the substrate transfer direction and first and second horizontal portions 510 and 530 extending in the substrate transfer direction at both end portions of the vertical portion 520. Herein, the first stripper 500 may include a tab portion 512 protruding from an outer portion of the first horizontal portion 510. The first horizontal portion 510 and the second horizontal portion 530 may be separated from each other to form the open side portion 540. The substrate transfer direction may correspond to a direction from the closed vertical portion 520 to the open side portion 540.

According to an embodiment, a metal thin film substrate may be provided up to end portions of the first horizontal portion 510 and the second horizontal portion 530 (e.g., as viewed in a top view). Furthermore, after the first mold is lowered and a metal thin film substrate provided between a die and the first stripper 500 of the first mold and a punch and a second stripper of the second mold is fixed, the metal thin film substrate may be adsorbed and fixed by an electrode plate transfer device entered through the open side portion 540 in a direction opposite to a substrate transfer direction.

Figure 6:
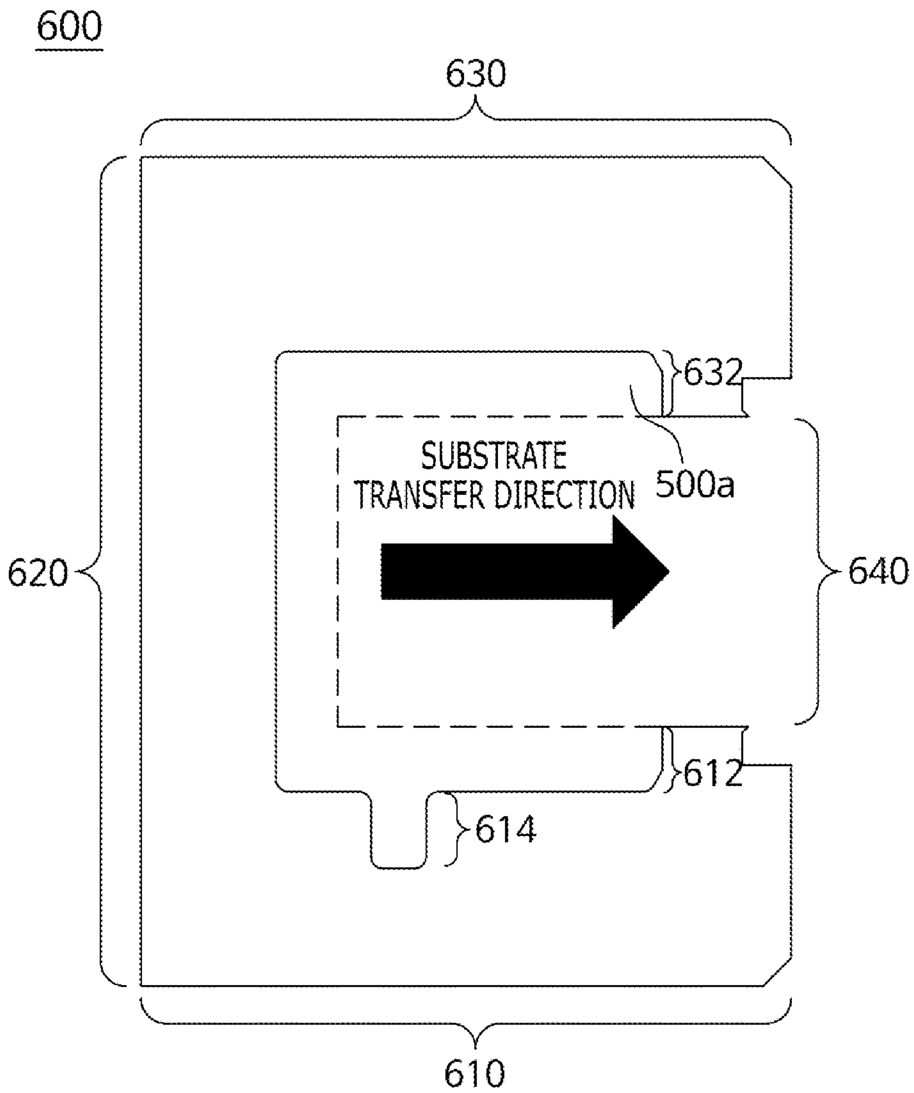
FIG. 6 illustrates a plan view showing a die according to an embodiment of the present disclosure.

FIG. 6 illustrates a plan view showing a die 600 according to an embodiment of the present disclosure. The die 600 may have a substantially same structure as the die 330 in FIG. 3.

Referring to FIG. 6, the die 600 may accommodate a first stripper (e.g., the first stripper 500 in FIG. 5). For example, the die 600 may have a structure that surrounds only (e.g., extends along only) outer portions of a first horizontal portion (e.g., the first horizontal portion 510 of FIG. 5), a tab portion (e.g., the tab portion 512 of FIG. 5), a vertical portion (e.g., the vertical portion 520 of FIG. 5), and a second horizontal portion (e.g., the second horizontal portion 530 of FIG. 5) of the first stripper (e.g., the first stripper 500 of FIG. 5).

According to an embodiment, the die 600 may be designed such that a side portion 640 is open. For example, the die 600 may include a vertical portion 620 perpendicular to a substrate transfer direction indicated by an arrow and first and second horizontal portions 610 and 630 extending in the substrate transfer direction at both ends of the vertical portion 620. Herein, the end portions of the first and second horizontal portions 610 and 630 may respectively include first and second protrusions 612 and 632 protruding inward. Furthermore, a recess portion 614 capable of accommodating a tab portion (e.g., the tab portion 512 in FIG. 5) of a first stripper may be formed on an inner side portion of the first horizontal portion 610. The first horizontal portion 610 and the second horizontal portion 630 may be separated from each other to form the open side portion 640. The substrate transfer direction may correspond to a direction from the closed vertical portion 620 to the open side portion 640.

Referring to FIG. 6, a first stripper accommodation region 500*a* indicated by dotted and solid lines is a region which is formed by a recess portion 614 of the first horizontal portion 610 of the die 600, an inner side portion of the first horizontal portion 610 including a first protrusion 612, an inner side portion of the vertical portion 620, and an inner side portion of the second horizontal portion 630 including a second protrusion 632 of the second horizontal portion 630, and in which a first stripper is accommodated. That is, the first stripper (i.e., the first stripper 500 of FIG. 5) may be positioned within the first stripper accommodation region 500*a*, with the tab portion 512 of the first stripper 500 fitting within the recess portion 614 of the die 600 and the open side portion 540 of the first stripper 500 being aligned with the open side portion 640 of the die 600. According to an embodiment, an electrode plate transfer device may enter in a direction opposite to the substrate transfer direction through the open side portion 640 of the die 600.

Figure 7:
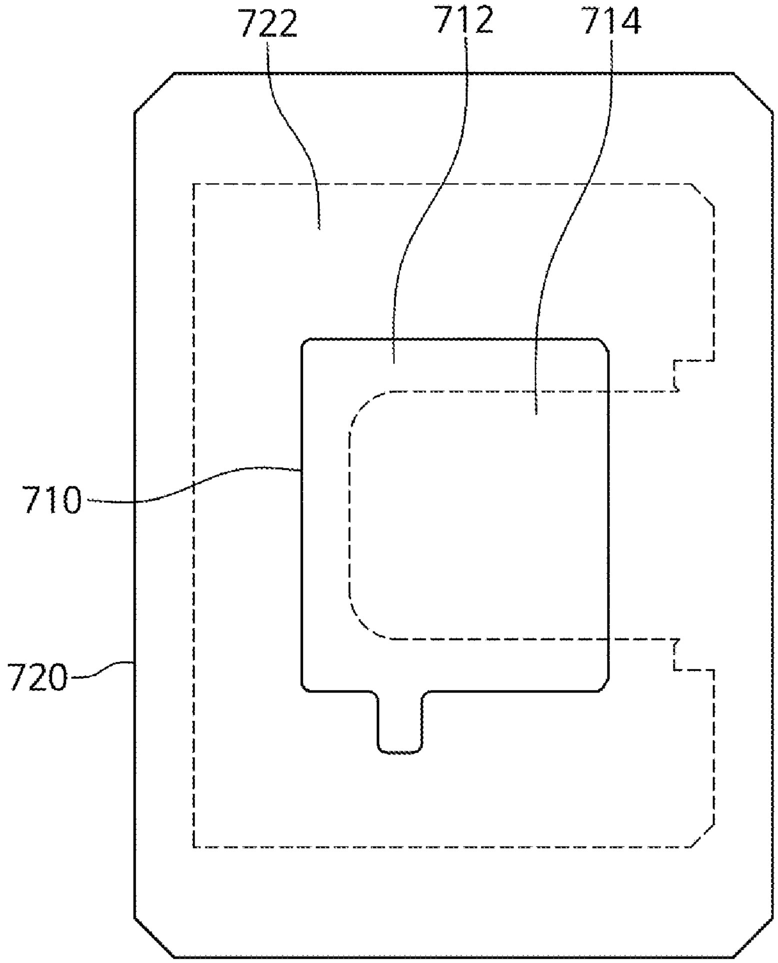
FIG. 7 illustrates a plan view showing a punch and a second stripper according to an embodiment of the present disclosure.

FIG. 7 illustrates a plan view showing a punch 710 and a second stripper 720 according to an embodiment of the present disclosure. The punch 710 and the second stripper 720 may have substantially same structures as the punch 440 and second stripper 430 of FIG. 4, respectively.

Referring to FIG. 7, the second stripper 720 may accommodate the punch 710. The punch 710 may have a shape of a predetermined standard to be used for a secondary battery electrode plate. Furthermore, the second stripper 720 may have an internal space in which the punch 710 may be accommodated. That is, the second stripper 720 may have a structure surrounding an outer portion of the punch 710.

For example, the punch 710 indicated by a solid line may have a structure corresponding to a closed structure in which both ends of a first horizontal portion (e.g., the first horizontal portion 510 in FIG. 5) and a second horizontal portion (e.g., the second horizontal portion 530 in FIG. 5) of a first stripper (e.g., the first stripper 500 in FIG. 5) are connected to each other. Furthermore, the second stripper 720 indicated by a solid line may have an internal space to accommodate an outer shape of all corners and a tab portion of the punch 710, and the punch 710 may be buried in the internal space formed in the second stripper 720.

For the sake of convenience of description, FIG. 7 illustrates a region 722, which is indicated by dotted and solid lines, corresponding to a die included in a first mold (e.g., the first mold 110 in FIG. 1) and a region 712, which is indicated by dotted and solid lines, corresponding to a first stripper. According to an embodiment, in a state where the first mold is lowered, a die (e.g., the die 330 in FIG. 3) may be in contact with the region 722 that is a die corresponding region on the second stripper 720, and the first stripper (e.g., the first stripper 340 in FIG. 3) may be in contact with the region 712 corresponding to the first stripper on the punch 710. A region 714 (which does not correspond to the first stripper) on the punch 710 may be a region opened to the outside. In an embodiment, an electrode plate transfer device may enter the region 714 which does not correspond to the first stripper opened to the outside and fix one end of a metal thin film substrate provided on the punch 710. In a state where the first mold is lowered secondly, the second stripper 720 and the die of the first mold are lowered along an outline of the punch 710 to cut the metal thin film substrate provided between the first mold and the second mold in a shape of the punch 710.

Figure 8:
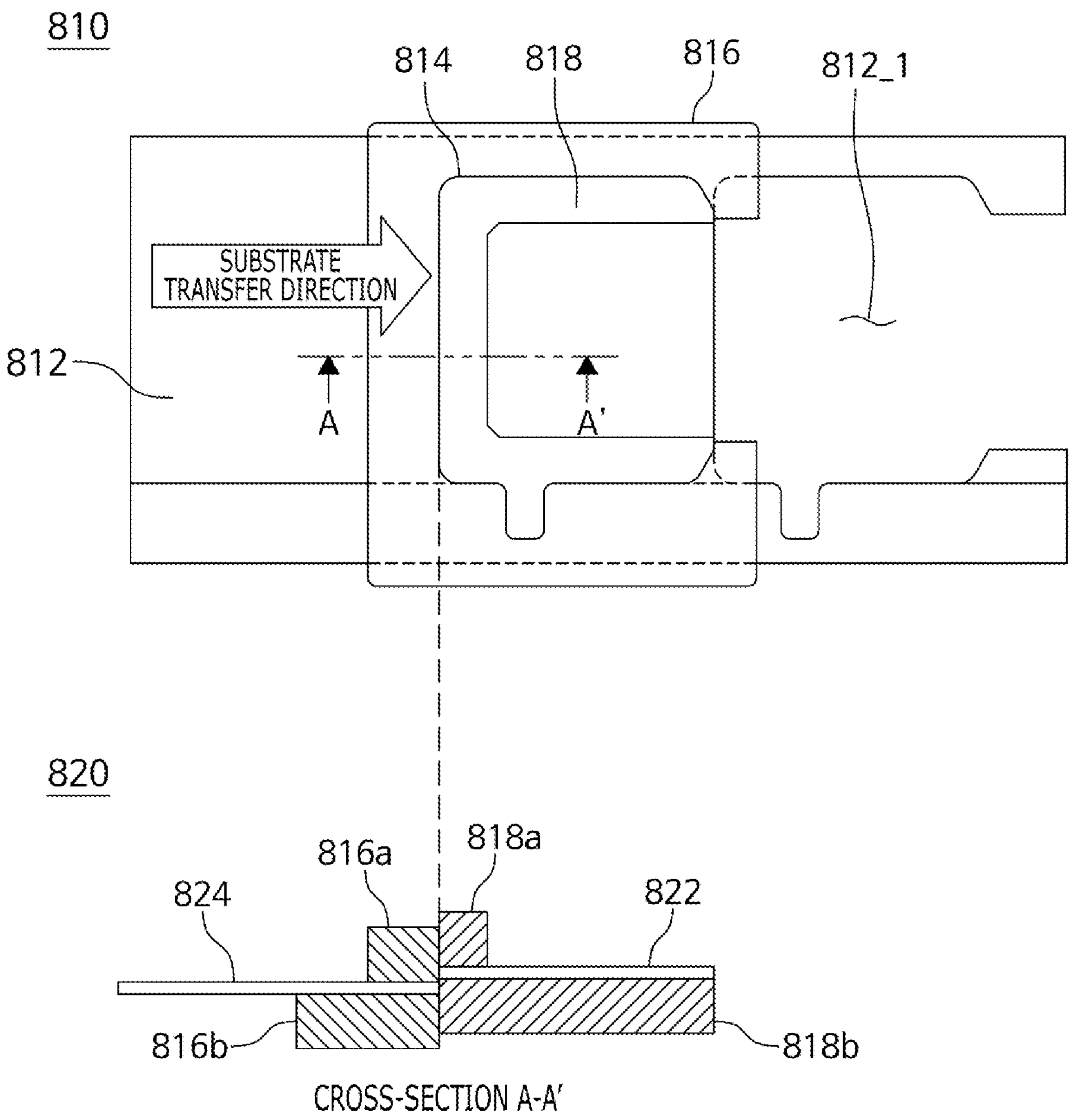
FIG. 8 illustrates a process of cutting a metal thin film substrate by using a blanking device, according to an embodiment of the present disclosure.

FIG. 8 illustrates a process of cutting a metal thin film substrate by using a blanking device, according to an embodiment of the present disclosure. According to an embodiment, a metal thin film substrate 812 provided between a die 816*a* and a first stripper 818*a* of a first mold (e.g., the first mold 110 in FIG. 1) and a second stripper 816*b* and a punch 818*b* of a second mold (e.g., the second mold 120 in FIG. 1) may be blanked by the lowering of the first mold and cut into an electrode plate of a predetermined shape.

Referring to FIG. 8, a plan view 810 illustrates a process in which the metal thin film substrate 812 is provided inside a blanking device (e.g., the blanking device 100 in FIG. 1) and blanked. The metal thin film substrate 812 may be punched and cut along a cutting line 814 formed between a first region 816 and a second region 818. Herein, the first region 816 may indicate a region where the die 816*a* of the first mold and the second stripper 816*b* of the second mold are in contact with the metal thin film substrate 812. Furthermore, the second region 818 may indicate a region where the second stripper 816*b* of the first mold and the punch 818*b* of the second mold are in contact with the metal thin film substrate 812. After the first mold of the blanking device is lowered and lifted once, the metal thin film substrate 812 may be moved in a transfer direction such that the punched pattern is continuously formed. For example, a cutting line of a preceding punching region 812_1 may be continuously connected to the cutting line 814 of the ongoing blanking region (e.g., the cutting line of the preceding punching region 812_1 may be an outermost edge of the next blanking region).

A cross-sectional view 820 refers to a cross-sectional view of section A-A' of the plan view 810. As illustrated in the cross-sectional view 820, a blanking process of the metal thin film substrate 812 may be performed by lowering the die 816*a* of the first mold with the second stripper 816*b* of the second mold (after securing the metal thin film substrate 812 between the first and second molds) more than the first stripper 818*a* of the first mold with the punch 818*b* of the second mold (e.g., so a distance from a bottom of the die 816*a* to a surface supporting the blanking device is smaller than a distance from the bottom of the first stripper 818*a* to the surface supporting the blanking device). Accordingly, the metal thin film substrate 812 between the die 816*a* and the second stripper 816*b* may be cut into an outer shape of the punch 818*b*. In this case, a cut metal thin film substrate 822 (a portion of the metal thin film substrate 812 between the first stripper 818*a* and the punch 818*b*) may be used as an electrode plate, and the other metal thin film substrate 824 may be subsequently cut into an electrode plate.

Accordingly, cutting lines of the punched regions adjacent to each other are continuously formed, and a blanking process may be performed without leaving an extra space on a metal thin film substrate. Thus, the productivity of an electrode plate to a substrate area may be increased.

Figure 9:
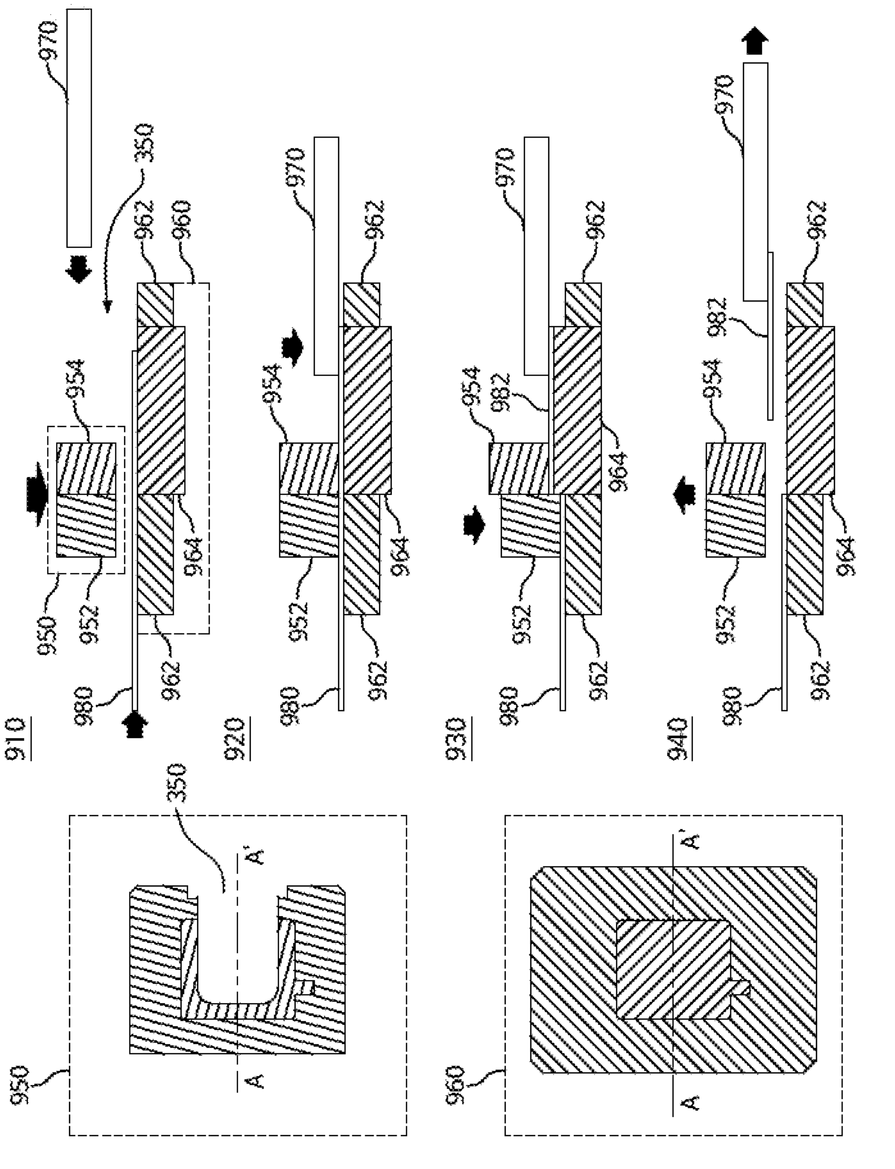
FIG. 9 illustrates a process of extracting an electrode plate by an electrode plate transfer device while a metal thin film substrate is cut, according to an embodiment of the present disclosure.

FIG. 9 illustrates a process of extracting an electrode plate 982 by an electrode plate transfer device 970 while a metal thin film substrate 980 is cut, according to an embodiment of the present disclosure.

Referring to FIG. 9, according to an embodiment, the process of extracting the electrode plate 982 by the electrode plate transfer device 970 during cutting of the metal thin film substrate 980 may include first to fourth operations 910 to 940. A first cross-section 950 of FIG. 9 (i.e., a top dashed frame in the first operation 910) represents an example of a cross-section A-A' of a die 952 and a first stripper 954 of a first mold (e.g., the top view of the die 952 and the first stripper 954 are illustrated to the left of operation 910 with the line A-A'). Further, a second cross-section 960 of FIG. 9 (i.e., a bottom dashed frame in operation 910) represents an example of a cross-section A-A' of a second stripper 962 and a punch 964 of a second mold (e.g., the top view of the second stripper 962 and the punch 964 are illustrated to the left of the third operation 930 with the line A-A').

The first operation 910 represents an example of an operation in which the metal thin film substrate 980 moves in a transfer direction, and the die 952 and the first stripper 954 are lowered toward the metal thin film substrate 980 (i.e., toward the second die). In this case, the electrode plate transfer device 970 may enter a blanking device through an open side portion of the die 952 and the first stripper 954 (i.e., seen in the top view to the left of the first operation 910).

The second operation 920 represents an example of a state where the metal thin film substrate 980 is aligned and is fixed by the die 952, the first stripper 954, the second stripper 962, and the punch 964. For example, as illustrated in FIG. 9, lower surfaces of the die 952 and the first stripper 954 may be coplanar, upper surfaces of the second stripper 962 and the punch 964 may be coplanar, and the metal thin film substrate 980 may be completely flat and in direct contact with the lower surfaces of the die 952 and the first stripper 954 and with the upper surfaces of the second stripper 962 and the punch 964. For example, an edge of the metal thin film substrate 980 (i.e., outermost edges oriented in the transfer direction) may be aligned to match a boundary region between the punch 964 and the second stripper 962 (illustrated in the dashed circle in the second operation 920). The electrode plate transfer device 970 may adsorb and fix an end portion of the metal thin film substrate 980 and apply tension to the metal thin film substrate 980 (e.g., the electrode plate transfer device 970 may contact and secure an upper surface of the end portion of the metal thin film substrate 980 facing away from the second die).

The third operation 930 represents an example of an operation in which the die 952 and the second stripper 962 are lowered secondly (e.g., lowered together in a direction oriented toward a surface supporting the second die), while the first stripper 954 and the punch 964 remain unmoved, such that the metal thin film substrate 980 is cut (i.e., in a region between the moving second stripper 962 and the stationary punch 964). As the die 952 and the second stripper 962 are lowered toward a lower portion of the punch 964 (e.g., so lower surfaces of the second stripper 962 and punch 964 are coplanar), a substrate of a shape corresponding to the punch 964, i.e., the electrode plate 982, may be cut on the punch 964. In other words, the electrode plate 982 cut from the metal thin film substrate 980 may have a same shape as the punch 964 due vertical overlap thereof and removal (e.g., cutting away) of portion of the metal thin film substrate 980 not overlapping the punch 964.

The fourth operation 940 represents an example of an operation in which the die 952 and the first stripper 954 are lifted. Additionally, the second stripper 962 may also be lifted. In this case (e.g., simultaneously), the electrode plate transfer device 970 may extract the electrode plate 982 (to which it has been secured in the second operation 920) through the open side portion of the die 952 and the first stripper 954, and transfer the electrode plate 982 to a subsequent process, e.g., an inspection device for inspecting defects of an electrode plate.

Figure 10:
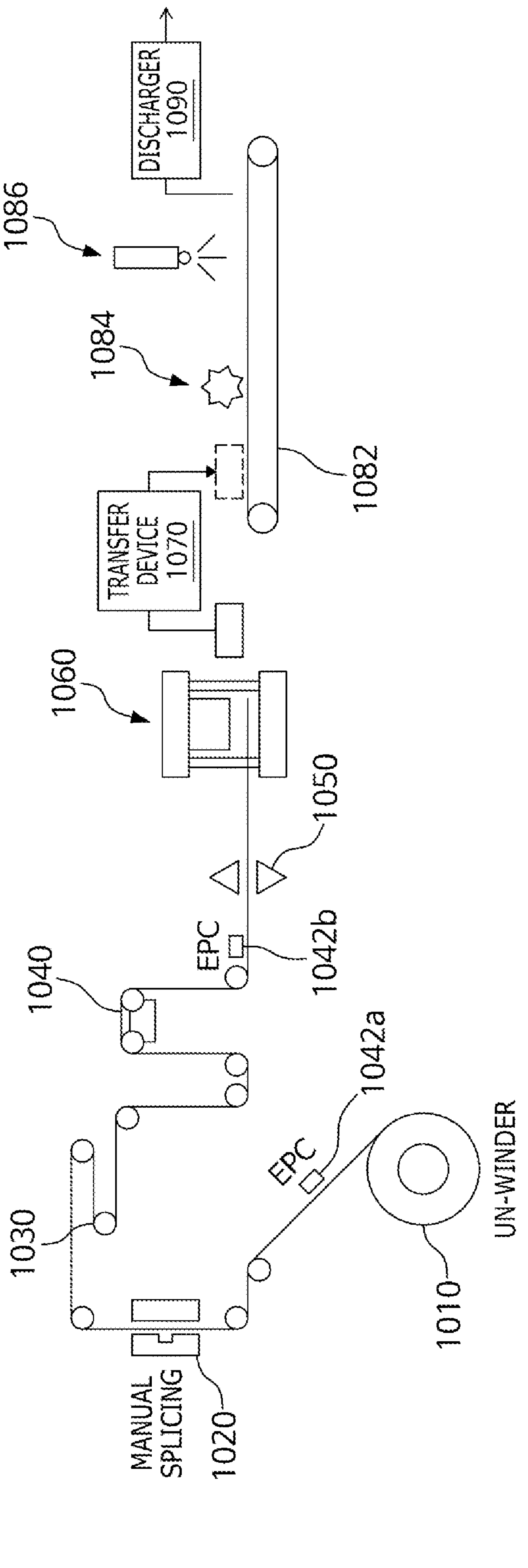
FIG. 10 illustrates a process of manufacturing an electrode plate by using a blanking device, according to an embodiment of the present disclosure.

FIG. 10 illustrates a process of manufacturing an electrode plate by using a blanking device 1060, according to an embodiment of the present disclosure.

A supply reel 1010 may unwind a metal thin film substrate wound on a reel. For example, the supply reel 1010 may unwind the wound metal thin film substrate by using a motor.

A substrate connecting device 1020 may recognize ends of the unwound metal thin film substrates and connect the separated metal thin film substrates to each other. A tension maintaining device 1030 may maintain the tension of a metal thin film substrate being unwound. For example, the tension maintaining device 1030 may rotate in a direction opposite to the direction in which a metal thin film substrate is unwound, thereby maintaining the tension of the metal thin film substrate.

A substrate alignment device 1040 may align the meandering of a metal thin film substrate by using information received from substrate alignment sensors 1042*a* and 1042*b* arranged on a line along which the metal thin film substrate is transferred.

A punching oil spray device 1050 is for mold sticking and may spray punching oil into a region, which corresponds to a tab portion (e.g., the tab portion 512 in FIG. 5) in the blanking device 1060, on the metal thin film substrate.

The blanking device 1060 may cut the provided metal thin film substrate into a predetermined standard shape, i.e., a punch shape. For example, the blanking device 1060 may align the supplied substrate, lower the first mold to fix the substrate, and blank the fixed substrate to make an electrode plate.

A transfer device 1070 (e.g., an electrode plate transfer device) may extract an electrode plate which is pulled in through one open side portion formed in a first mold of the blanking device 1060 and is cut. For example, after the first mold is lowered to fix the substrate, one end portion of the substrate may be adsorbed and fixed through one open side portion of the first mold, and in a state where the substrate is cut by the first mold, the transfer device 1070 may extract the cut substrate. The transfer device 1070 may transfer the extracted substrate to a conveyor 1082.

A sucker 1084 may suck foreign matters on the extracted substrate on the conveyor 1082, i.e., on an electrode plate. A visual inspection device 1086 may capture an image of the electrode plate by using an image sensor and determine whether the electrode plate is defective. A discharger 1090 may discharge the inspected electrode plate.

Figure 11:
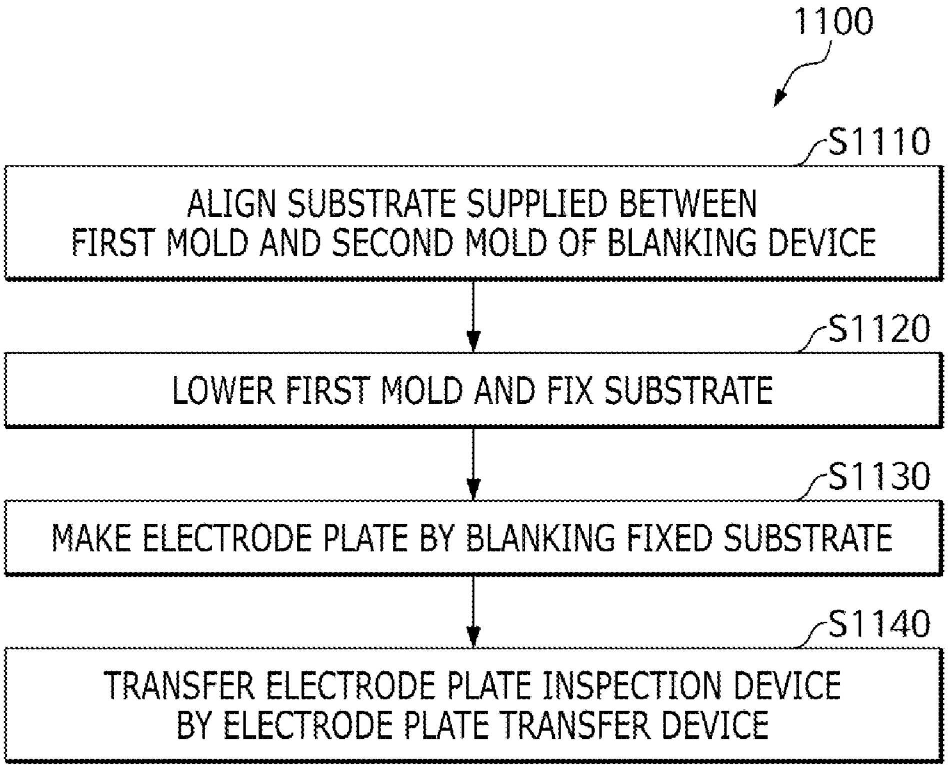
FIG. 11 illustrates a flowchart showing an example of a method of manufacturing an electrode plate for a secondary battery according to an embodiment of the present disclosure.

FIG. 11 illustrates a flowchart showing an example of a method 1100 of manufacturing an electrode plate for a secondary battery according to an embodiment of the present disclosure.

Referring to FIG. 11, according to an embodiment, the method 1100 may start by aligning a supplied substrate between a first mold and a second mold of a blanking device by using the blanking device (S1110). For example, an end edge of the supplied substrate may be aligned with an end edge of a punch included in the second mold in a discharge direction of the substrate by the blanking device.

Then, the first mold may be lowered and may fix the substrate (S1120). Herein, the first mold may have a structure where one side portion into which an electrode plate transfer device enters is open in a direction in which the substrate is pulled out. For example, the first mold may be lowered and may fix the supplied substrate between a die and a first stripper included in the first mold and a punch and a second stripper included in the second mold.

Thereafter, tension may be applied to the substrate fixed between the die and the first stripper included in the first mold and the punch and the second stripper included in the second mold by the electrode plate transfer device entered through one open side portion. For example, the tension may be applied to the vacuum-adsorbed substrate by the electrode plate transfer device.

Then, the electrode plate may be made by blanking the fixed substrate by the blanking device (S1130). For example, in a state where the substrate is fixed, the die and second stripper may be lowered to blank the substrate.

Then, the electrode plate may be transferred to the inspection device by the electrode plate transfer device (S1140). Thereafter, foreign matters of the electrode plate may be removed by a sucker, defects of the electrode plate may be detected by a vision inspection device, and the electrode plate may be discharged by a discharger.

By way of summation and review, the notching process may refer to a process of manufacturing an electrode plate that meets specifications by blanking the supplied substrate by using a punching mold device. The notching process may include supplying a substrate to a punching mold device, blanking the substrate by using the punching mold device, and transferring the blanked substrate to an inspection device by using a transfer device. However, in this process sequence, the substrate may not be blanked continuously (e.g., may require stopping between blanking steps) because the substrate has to be transferred by using a transfer device between blanking steps.

In contrast, the present disclosure provides a blanking device and a method of manufacturing an electrode plate for a secondary battery using the blanking device. That is, according to embodiments, the blanking device may operate continuously as a transfer device connects to a substrate, while an upper mold is lowered, and transfers a cut portion of the substrate to a transfer device, while the upper mold lifts, thereby increasing the blanking process speed.

Further, the blanking process may be performed without leaving a space on a metal thin film substrate, and thus, productivity of electrode plates to a substrate area may be increased. Furthermore, cutting lines of adjacent punching regions are continuously formed to perform a blanking process without leaving an extra space on a metal thin film substrate, and thus, productivity of electrode plates to a substrate area may be increased.

Although the present disclosure has been described above with respect to embodiments thereof, the present disclosure is not limited thereto. Various modifications and variations can be made thereto by those skilled in the art within the spirit of the present disclosure and the equivalent scope of the appended claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A blanking device for a secondary battery electrode plate, the blanking device comprising:

a first mold including a die and a first stripper, the die surrounding the first stripper and having a structure with one open side portion, the first stripper having a structure with one open side portion aligned with the one open side portion of the die, and an open region extending from an outside into the first stripper through the one open side portion of the first stripper and through the one open side portion of the die along a direction perpendicular to a movement direction of the first mold; and a second mold facing the first mold, the second mold including a punch and a second stripper, and the first mold being moveable toward the second mold.

2. The blanking device as claimed in claim 1, wherein:

the first stripper includes a vertical portion perpendicular to a longitudinal direction of the open region, a first horizontal portion and a second horizontal portion extending in the longitudinal direction of the open region at both ends of the vertical portion, and a tab portion protruding from an outer portion of the first horizontal portion, the first horizontal portion and the second horizontal portion are separated from each other, the one open side portion of the first stripper being between the first horizontal portion and the second horizontal portion, and the vertical portion, the first horizontal portion, and the second horizontal portion are linear portions that are coplanar with each other and are parallel to a surface of the second mold facing the first mold, the vertical portion, the first horizontal portion, and the second horizontal portion being arranged into an approximate II-shape around the open region.

3. The blanking device as claimed in claim 2, wherein the die has an approximate II-shape, as viewed in a top view, the die surrounding only outer portions of the first horizontal portion, the tab portion, the vertical portion, and the second horizontal portion of the first stripper.

4. The blanking device as claimed in claim 3, wherein the punch has a quadrangular structure with a tab extending from an outer side of the quadrangular structure, as viewed in a top view, the first horizontal portion and the second horizontal portion of the first stripper overlapping edges of the punch, as viewed in the top view.

5. The blanking device as claimed in claim 4, wherein the second stripper surrounds an outer portion of the punch.

6. The blanking device as claimed in claim 1, wherein the die and the first stripper respectively face the second stripper and the punch.

7. The blanking device as claimed in claim 6, wherein:

the die and the first stripper are configured to be moveable together toward the second stripper and the punch, and the die and the second stripper are configured to be moveable together toward a bottom of the punch, such that the die is misaligned with the first stripper.

8. The blanking device as claimed in claim 1, wherein the first mold further includes:

a die plate accommodating the die and the first stripper; and a first base plate coupled to the die plate.

9. The blanking device as claimed in claim 8, wherein the second mold further include:

a punch plate accommodating the punch and the second stripper; and a second base plate coupled to the punch plate.

10. The blanking device as claimed in claim 9, further comprising:

a main guide post connecting the first base plate to the second base plate;

a sub-guide post connecting the die plate to the second base plate; and a punch guide post connecting the second stripper to the second base plate.

11. The blanking device as claimed in claim 10, wherein the main guide post and the sub-guide post are configured to guide the first mold toward the second mold.

12. The blanking device as claimed in claim 10, wherein the sub-guide post is configured to guide the die plate and the die toward a bottom of the punch from a state where the die and the first stripper are aligned and are respectively in contact with the punch and the second stripper.

13. The blanking device as claimed in claim 10, wherein the punch guide post is configured to guide the second stripper toward a bottom of the punch from a state where the die and the first stripper are aligned and are respectively in contact the punch and the second stripper.

14. The blanking device as claimed in claim 1, further comprising an electrode plate transfer device moveable through the open region toward the die and the first stripper.

* * * * *